(No Model.)
J. C. BLEVNEY.
MACHINE FOR PULVERIZING ORES, &c.
No. 309,187. Patented Dec. 16, 1884.
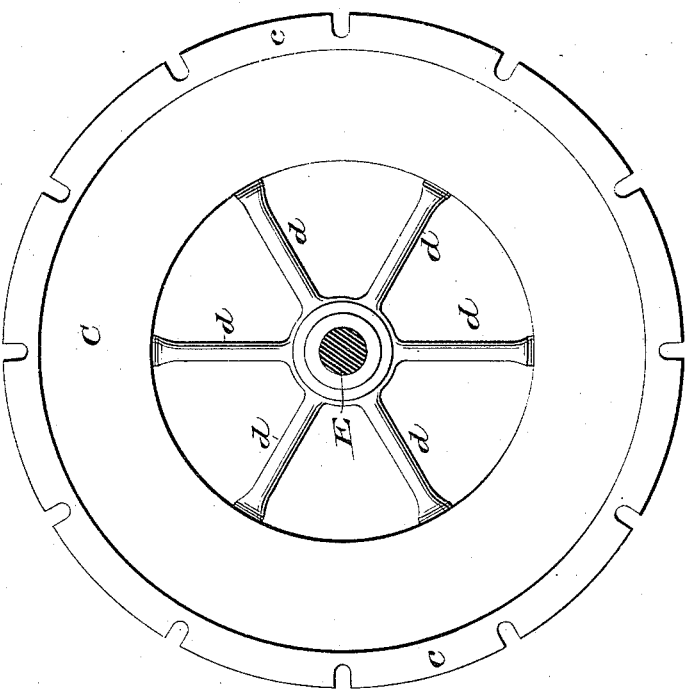
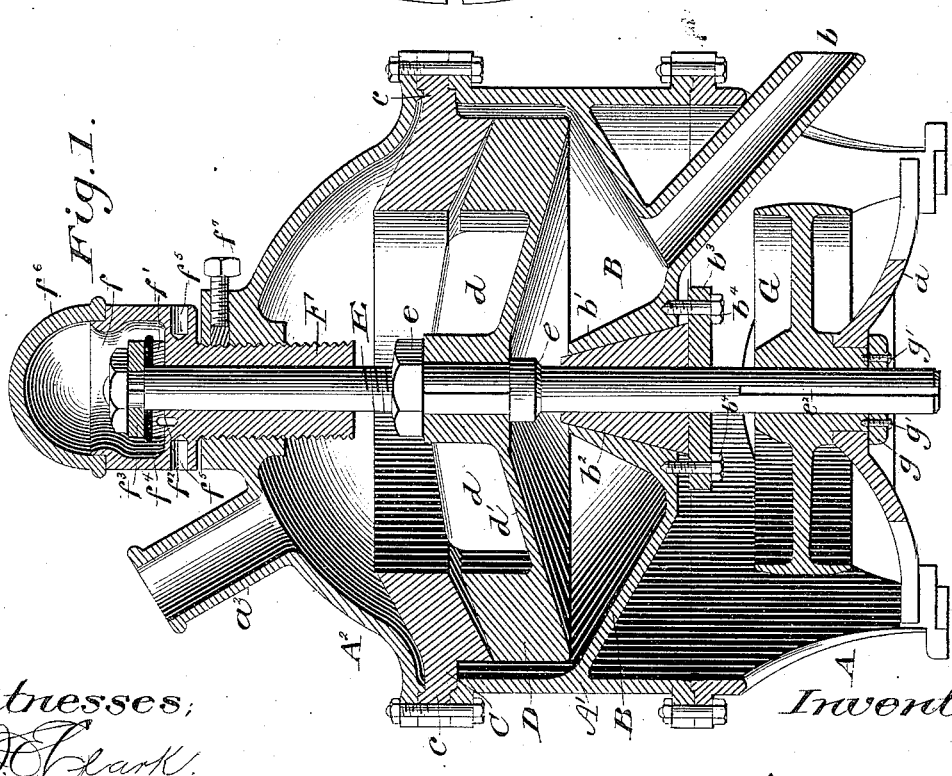
Witnesses:
J. E. Clark.
D. W. Edelin.
Inventor:
John C. Blevney

UNITED STATES PATENT OFFICE.

JOHN C. BLEVNEY, OF NEWARK, NEW JERSEY.

MACHINE FOR PULVERIZING ORES, &c.

SPECIFICATION forming part of Letters Patent No. 309,187, dated December 16, 1884.

Application filed January 26, 1884. (No model.)

*To all whom it may concern:*

Be it known that I, JOHN C. BLEVNEY, a citizen of the United States, and a resident of the city of Newark, in the county of Essex and State of New Jersey, have invented certain new and useful Improvements in Machines for Pulverizing Ores, &c., of which the following is a specification.

The object of my invention is to produce a mill for grinding ores and other substances, which, while it will be efficient in operation and may be manufactured at a comparatively small expense, will be so constructed that the parts thereof may be readily assembled together by unskilled persons without liability of getting the shaft-bearings out of true or of disarranging other working parts of the machine.

In the drawings, Figure 1 is a vertical sectional view of my mill, and Fig. 2 a plan view of the grinding-rings.

The frame-work or casing of my mill consists, preferably, of three superposed portions, A, A', and $A^2$, as shown in Fig. 1.

Formed integral with or secured to the portion A is a spider, $a$, which serves as the lower lateral bearing for the shaft E through the driving-pulley G. The central portion, A', of the casing supports the receiving-pan B, which is preferably formed integral therewith, said pan serving as a support for the central bearing of the shaft E. The upper portion or cover, $A^2$, of the casing supports the upper bearing for the shaft, and is provided with the inlet $a^2$ for the material to be ground.

C is the stationary grinding-ring having a central opening, and D the rotary grinding-ring, connected to the shaft E by a spline or other suitable means of attachment.

The several parts of the casing are attached together by bolts passing through rabbeted rims, as shown. The stationary grinding-ring C is provided with a rabbeted rim or flange, $c$, fitting between the rabbeted rims of the parts $A^2$ and A' of the casing. As each part of the casing supports a bearing for the shaft E, it is necessary that in assembling said casing the parts thereof should be placed with exactness, which is insured by the rabbeted rims, which guide the parts of the casing into position, while the rims between which is interposed the rabbeted rim $c$ of the stationary grinding-ring C serve to hold said ring firmly in its true position. As said ring is of cast metal, it will be understood that the rim thereof may be readily fitted to the rabbeted casing by turning, thus contributing to cheapness of construction. The rotary grinding-ring D is secured to the shaft E, between collars $e$ thereon, so that endwise adjustment of the said shaft will cause said ring to be adjusted relative to the stationary ring according to the requirement of the substance to be ground. This adjustment is effected by means of a screw-sleeve, F, tapped in the part $A^2$ of the casing, and serving as a bearing and suspensory support for said shaft. Said sleeve is provided with a cup or recess, $f$, in which is placed a hardened steel washer, $f'$, having a pin, $f^2$, to prevent its rotation. Another hardened washer, $f^3$, is secured to the shaft, and between said hardened washers is interposed a soft-metal washer, $f^4$. The sleeve F is provided with a series of holes, $f^5$, in which may be inserted a key for turning the same, and thereby adjusting the suspended shaft and its attached grinding-ring up or down, as may be required to bring its working-face in any desired position relative to the working-face of the stationary ring. After adjustment said sleeve may be fixed by a set-screw, $f^7$. The recess $f$ serves to contain the lubricant, and is covered by a hollow cap, $f^6$, beneath which may be placed fibrous material saturated with lubricating fluid. When the shaft E is rotated, the soft-metal washer $f^4$ will turn with the rotary washer $f^3$ or remain stationary with the washer $f'$, according as the friction between the soft-metal washer and the rotary or the stationary hardened washers may be the greater, and the oil will penetrate the joint, which for the time being consists of the two faces which are not wearing against each other, and thus the bearing-surfaces will be alternately shifted.

The bearing for the vertical shaft above described, instead of being placed at the top of the shaft, might be used in connection with a vertical shaft stepped or supported at the bottom. The receiving-pan B, to which is attached the outlet-spout $b$, has a central conical hub or projection, $b'$, in which is fitted a conical split sleeve, $b^2$, forming a bearing for the shaft E, and capable of vertical adjustment to take up wear by means of a washer, $b^3$, and adjusting-screws $b^4$. It is obvious that the vertical adjustment of said sleeve will tend to keep the shaft central in its bearings.

G is the driving-pulley, which is secured to the shaft E by a spline, $e^2$, permitting of an endwise adjustment of said shaft, said pulley being fixed to the spider $a$ by a cap, $g$, fastened to the hub of the pulley by screws $g'\ g'$.

The grinding-rings C and D are shown as being frustro-conical, or as having smooth grinding-faces, which are both inclined relative to a horizontal plane and to each other, so that the space between them gradually decreases toward their peripheries; and while I consider this construction the best for most purposes, it will be understood that it may be varied by making one of the said grinding-faces, as that of the rotary ring, horizontal, and inclining the face of the other ring relative thereto, so that the space between them will taper outward to successively reduce the outwardly-moving material.

As it is desirable to make the rotary grinding-ring (which also serves the purpose of a balance or fly-wheel) as light as possible for transportation, it is provided with an annular recess, in which are arranged a series of radial ribs, $d$, connecting the rim of the wheel with its hub, said rim being also supported by a disk, $d'$, secured to or formed integral therewith. The spaces between the ribs $d$ serve as pockets, which, when filled with heavy ore, make the wheel nearly as heavy as it would be if made of solid metal.

The operation of my mill will be readily understood from the foregoing. The material to be reduced entering at the inlet $a^2$ falls through the open stationary ring C into the pockets of the rotary ring D. As the latter revolves, the material will be forced outward between the grinding-faces of the rings, and after being properly reduced will fall into the receiving-pan B, and will find egress through the outlet $b$. As the ring D rotates, the ribs $d$ will prevent the material from slipping, as would be liable to occur were it not for said ribs.

Having thus described my invention, I claim—

1. In a grinding-mill, the combination, with a sectional rabbeted casing, of a stationary grinding-ring having a rabbeted rim or flange by which it is secured between two rabbeted faces of said casing, substantially as set forth.

2. The combination, with a vertical shaft, of two hardened metallic washers, one of which is stationary, and the other of which rotates with the shaft, a soft metallic washer surrounding said shaft and interposed between said hardened washers, and a lubricant-chamber surrounding said washers, substantially as set forth.

3. In a grinding-mill, the combination, with the casing, the vertical shaft, and the stationary and rotary grinding-rings, of the adjustable sleeve F, tapped in said casing, and provided with a lubricant-chamber, the hardened washers $f'$ and $f^3$, and the interposed soft metallic washer $f^4$, surrounding said shaft, said washers being all arranged within said chamber, substantially as set forth.

In testimony that I claim the foregoing as my invention, I have signed my name, in presence of two witnesses, this 24th day of January, 1884.

JOHN C. BLEVNEY.

Witnesses:
GEORGE H. VINCENT,
MARY H. BLEVNEY.